United States Patent [19]
Dvorchak et al.

[11] Patent Number: 6,150,476
[45] Date of Patent: Nov. 21, 2000

[54] COATING COMPOSITIONS CONTAINING A MIXTURE OF ETHYLENICALLY UNSATURATED POLYURETHANES

[75] Inventors: Michael J. Dvorchak, Monroeville; Ligia Martin, Bridgeville; Pamela C. Rozman, Fair Oaks, all of Pa.

[73] Assignee: Bayer Corporation, Pittsburgh, Pa.

[21] Appl. No.: 09/220,964

[22] Filed: Dec. 23, 1998

[51] Int. Cl.$^7$ .............................. C08L 75/08; C08L 75/14
[52] U.S. Cl. .................. 525/455; 525/454; 525/457; 525/458; 525/460
[58] Field of Search .................................. 525/455, 457, 525/454, 458, 460

[56] References Cited

U.S. PATENT DOCUMENTS

| | | | |
|---|---|---|---|
| 4,223,099 | 9/1980 | von Harpe et al. | 525/126 |
| 4,380,604 | 4/1983 | Neuhaus et al. | 524/873 |
| 4,446,286 | 5/1984 | Kolycheck et al. | 525/455 |
| 4,467,078 | 8/1984 | Kolycheck et al. | 525/455 |
| 4,829,123 | 5/1989 | Shigematsu et al. | 525/28 |
| 5,066,733 | 11/1991 | Martz et al. | 525/455 |
| 5,438,106 | 8/1995 | Siranovich et al. | 525/440 |
| 5,726,255 | 3/1998 | Meixner et al. | 525/438 |
| 5,739,251 | 4/1998 | Venham et al. | 528/49 |
| 5,767,220 | 6/1998 | Venham et al. | 528/49 |
| 5,777,024 | 7/1998 | Killilea et al. | 524/590 |

*Primary Examiner*—Ana Woodward
*Attorney, Agent, or Firm*—Joseph C. Gil; Thomas W. Roy

[57] ABSTRACT

The present invention relates to a mixture of ethylenically unsaturated polyurethanes containing I) 5 to 95% by weight, based on the weight of components I) and II), of ethylenically unsaturated polyurethanes which are substantially free from isocyanate groups and have a) a content of $\beta,\gamma$-ethylenically unsaturated ether groups (calculated as C=C, MW 24) incorporated through allophanate groups of 0.5 to 10% by weight, b) an allophanate group content (calculated as $N_2C_2HO_3$, MW 101) of 1 to 20% by weight and c) a total content of ethylenically unsaturated groups of (calculated as C=C, MW 24) of 1 to 15% by weight, II) 5 to 95% by weight, based on the weight of components I) and II), of ethylenically unsaturated polyurethanes which are substantially free from isocyanate groups and are based on the reaction products of a) cyclic diisocyanates having (cyclo)aliphatically bound isocyanate groups with b)compounds containing alcoholic hydroxyl groups and prepared at a COOH/OH equivalent ratio of 0.6 to 0.95 from i) (meth)acrylic acid and ii) tri- or tetrahydric ether alcohols having a molecular weight of 180 to 1000, which contain 2 to 10 ethylene oxide units, $-CH_2-CH_2-O-$, as part of one or more ether structures and which contain up to 20 mole %, based on the total moles of alkylene oxide units, of propylene oxide units, $-CH_2-CH(CH_3)-O-$, and III) up to 200%, based on the total weight of the coating composition, of copolymerizable monomers that do not contain urethane groups. The present invention also relates one-component coating compositions containing these mixtures and to substrates coated with these coating compositions.

17 Claims, No Drawings

6,150,476

COATING COMPOSITIONS CONTAINING A MIXTURE OF ETHYLENICALLY UNSATURATED POLYURETHANES

BACKGROUND OF THE INVENTION

1. Field of the Invention

The present invention relates to a mixture of ethylenically unsaturated polyurethanes, to one-component coating compositions containing these polyurethanes as binders and to the use of these compositions for preparing coated substrates.

2. Description of the Prior Art

Low viscosity, aliphatic polyurethanes that contain acryloyl groups are known and described in U.S. Pat. Nos. 5,739,251 and 5,767,220. These polyurethanes can be formulated without the use of significant amounts of organic solvents or reactive diluents, which are environmentally objectionable and regulated by the government.

Coatings prepared by curing these polyurethanes, e.g., in the presence of UV light, possess many valuable properties, including hardness, solvent resistance and surface appearance. However, additional properties are necessary in order for these coating compositions to be suitable for multi-coat applications, such as automotive or wood coatings. For example, it must be possible to sand the surface before the application of the next coating in order to improve intercoat adhesion. Sanding abrades the surface, which provides additional bonding sites for the next coating.

One of the deficiencies of coatings prepared from ethylenically unsaturated polyurethanes is that they are very difficult to overcoat, which is primarily due to the fact that these coatings are not sandable. Either too much energy is necessary to abrade the surface or a phenomenon known as sandpaper loading takes place.

Accordingly, it is an object of the present invention to provide ethylenically unsaturated polyurethanes that possess improved sandability such that they are suitable for multi-coat applications. It is an additional object of the present invention to improve the sandability of these coatings, while also retaining the other valuable properties of the prior art coatings.

This object can be achieved by using the mixtures of ethylenically unsaturated polyurethanes according to the invention which are described in detail hereinafter. The fact that coatings prepared from the inventive mixtures possess improved sandability is surprising since individually neither resin possess this property.

SUMMARY OF THE INVENTION

The present invention relates to a mixture of ethylenically unsaturated polyurethanes containing I) 5 to 95% by weight, based on the weight of components I) and II), of ethylenically unsaturated polyurethanes which are substantially free from isocyanate groups and have a) a content of β,γ-ethylenically unsaturated ether groups (calculated as C=C, MW 24) incorporated through allophanate groups of 0.5 to 10% by weight, b) an allophanate group content (calculated as $N_2C_2HO_3$, MW 101) of 1 to 20% by weight and c) a total content of ethylenically unsaturated groups of (calculated as C=C, MW 24) of 1 to 15% by weight, II) 5 to 95% by weight, based on the weight of components I) and II), of ethylenically unsaturated polyurethanes which are substantially free from isocyanate groups and are based on the reaction products of a) cyclic diisocyanates having (cyclo)aliphatically bound isocyanate groups with b) compounds containing alcoholic hydroxyl groups and prepared at a COOH/OH equivalent ratio of 0.6 to 0.95 from i) (meth)acrylic acid and ii) tri- or tetrahydric ether alcohols having a molecular weight of 180 to 1000, which contain 2 to 10 ethylene oxide units, —$CH_2$—$CH_2$—O—, as part of one or more ether structures and which contain up to 20 mole %, based on the total moles of alkylene oxide units, of propylene oxide units, —$CH_2$—CH($CH_3$)—O—, and III) up to 200%, based on the total weight of the coating composition, of copolymerizable monomers that do not contain urethane groups.

The present invention also relates one-component coating compositions containing these mixtures and to substrates coated with these coating compositions.

DETAILED DESCRIPTION OF THE INVENTION

The ethylenically unsaturated polyisocyanates and the ethylenically unsaturated polyurethanes prepared therefrom are described in U.S. Pat. No. 5,739,251 (herein incorporated by reference).

The ethylenically unsaturated polyisocyanates, which are precursors for component I), are prepared in a one or two step process by 1) preparing a compound U, which contains urethane groups and optionally isocyanate groups, by reacting at an NCO:OH equivalent ratio of 1:1 to 120:1

A1) a polyisocyanate component having an NCO content of 20 to 56% by weight and an average NCO functionality of 1.8 to 2.5 and containing one or more organic polyisocyanates with B) an alcohol component having an average hydroxyl functionality of 1.0 to 1.8 and containing B1) 50 to 100% by weight, based on the weight of alcohol component B), of one or more ether alcohols containing at least one β,γ-ethylenically unsaturated ether group and B2) 0 to 50% by weight, based on the weight of alcohol component B) of a saturated alcohol component containing one or more saturated monofunctional or polyfunctional alcohols having a molecular weight of 32 to 500, 2) reacting compound U prepared in 1) with A2) a polyisocyanate component having an NCO content of 20 to 56% by weight and an average NCO functionality of 1.8 to 2.5 and containing one or more organic polyisocyanates, at an equivalent ratio of isocyanate groups of component A2) to urethane groups of compound U of at least 3:1 and optionally in the presence of catalysts which accelerate the reaction of urethane groups with isocyanate groups to form allophanate groups and 3) optionally removing at least a portion of excess, unreacted starting polyisocyanates by distillation.

The polyisocyanate component to be used as starting component A1) in the process according to the invention has an NCO content of 20 to 60% by weight, preferably 20 to 50% by weight, and an average NCO functionality of 1.8 to 2.5, preferably 2. Polyisocyanate component A1) is preferably selected from aliphatic or cycloaliphatic diisocyanates, such as 1,4-diisocyanatobutane, 1,5-diisocyanatopentane, 1,6-diisocyanato-hexane (HDI), 1,11-diisocyanatoundecane, 1,12-diisocyanatododecane, 2,2,4- and 2,4,4-trimethyl-1,6-diisocyanatohexane, 1-isocyanato-3,3,5-trimethyl-5-isocyanatomethyl cyclohexane (IPDI), 1,3-diisocyanato-cyclobutane, 1,3- and 1,4-diisocyanatocyclohexane, 4,4'-bis-(isocyanato-cyclohexyl)-methane (HMDI), 1,2-bis-(isocyanatomethyl)-cyclobutane, 1,3- and 1,4-bis-(isocyanatomethyl)-cyclohexane, hexahydro-2,4- and/or -2,6 -diisocyanatotoluene, 1-isocyanato-4(3)-isocyanatomethyl-1-methyl cyclohexane, p-xylylene diisocyanate and mixtures thereof.

Component A1) may also contain modification products of the preceding diisocyanates containing biuret, uretdione, isocyanurate, allophanate and/or carbodiimide groups, provided that the average functionality of component A1) is within the previously disclosed range. Monofunctional isocyanates may also be used to obtain special properties, although their use is not preferred.

Preferably, component A1) is selected from IPDI, HMDI and aliphatic diisocyanates such as HDI; more preferably HDI is used as component A1).

Polyisocyanate component A2) is an organic polyisocyanate or polyisocyanate mixture selected from the suitable polyisocyanates previously set forth for use as polyisocyanate component A1). The distinction between polyisocyanates A1) and polyisocyanates A2) is necessary because, even though both polyisocyanates are selected from the same polyisocyanates, polyisocyanate component A2) does not have to be the same as polyisocyanate component A1). Polyisocyanate component A2) is either the excess of starting polyisocyanate A1) present in the reaction mixture after urethane formation from components A1) and B), or an additional polyisocyanate—added after urethane formation—which may differ from the polyisocyanate A1). Depending upon the NCO/OH equivalent ratio used to prepare compound U, the different polyisocyanate component A2) may either be present alone or in admixture with excess starting polyisocyanate A1).

50 to 100%, preferably 80 to 100% and more preferably 100%, of alcohol component B) is made up of β,γ-ethylenically unsaturated ether alcohols B1) and optionally up to 50%, preferably up to 20%, by weight of saturated alcohols B2). Alcohol component B) has an average hydroxyl functionality of 1 to 1.8, preferably 1 to 1.2 and more preferably 1.

Ethylenically unsaturated alcohol component B1) is selected from β,γ-ethylenically unsaturated ether alcohols, preferably those having 5 to 14 carbon atoms. These unsaturated ether alcohols contain at least one and preferably at least two β,γ-ethylenically unsaturated ether groups corresponding to the formula

Examples of these ether alcohols include allyl alcohol, glycerol diallyl ether, trimethylol propane diallyl ether and pentaerythritol triallyl ether. Trimethylol propane diallyl ether and allyl alcohol are preferred.

The ethylenically unsaturated alcohol component B1) may also contain ether- or ester-functional alkoxylation products of the previously described ethylenically unsaturated ether alcohols, provided that such alkoxylation products satisfy the requirements of component B). The use of such alkoxylation products is less preferred.

Optional alcohol component B2) is selected from saturated alcohols having a molecular weight of 32 to 500, preferably 32 to 300. Suitable monoalcohols have been disclosed in U.S. Pat. Nos. 5,124,427, 5,208,334 and 5,235,018, the disclosures of which are herein incorporated by reference Examples of suitable monoalcohols include methanol, ethanol, n-propanol, isopropanol, methoxypropanol, the isomeric butanols, pentanols and hexanols, n-heptanol, n-octanol, n-nonanol, n-decanol, n-dodecanol, n-octadecanol, saturated fatty alcohols and mixtures thereof. Suitable polyhydric alcohols include ethylene glycol, propane-1,2- and -1,3-diol, butane-1,4- and -1,3-diol, hexane-1,6-diol, octane-1,8-diol, nonane-1,9-diol, decane-1,10-diol, dodecane-1,12-diol, octadecane-1,18-diol, neopentyl glycol, 1,4-bis-hydroxymethyl cyclohexane, 2-methyl-propane-1,3-diol, 2,2,4-trimethyl-pentane-1,3-diol, 2-ethylhexane-1,3-diol, glycerol, trimethylol propane, trimethylol ethane, the isomeric hexanetriols, pentaerythritol, sorbitol and mixtures of these saturated alcohols.

The process according to the invention may be carried out by reacting components A1) and B) at an NCO/OH equivalent ratio of 1:1 to 120:1, preferably 4:1 to 120:1, more preferably 6:1 to 60:1 and most preferably 8:1 to 30:1 in either a one or two step process to initially form urethane groups and subsequently the products according to the invention containing allophanate groups. This reaction generally takes place at a temperature of 30 to 200° C. and preferably at a temperature of 50 to 160° C., the temperature gradually being increased within these ranges. Known catalysts for accelerating the allophanatization reaction between urethane and isocyanate groups are preferably used at least during the allophanatization portion of the reaction.

Suitable catalysts include triethylamine, tributylamine, N,N,N'N'-tetramethylbutyl-1,4-diamine, bis(dimethylamino)ethyl ether, dimethyl ethanolamine, 1,4-diaza-bicyclo[2,2,2]octane, diazobicycloundecene, N,N-dimethylbenzylamine, 1- and 2-methyl imidazole, tris(dimethylamino-methyl)-phenol, pyridine, Mannich bases, morpholines, tetraalkylammonium hydroxides, trimethyl benzylammonium hydroxide and alkali metal hydroxides (such as sodium hydroxide), alkali metal phenolates, metal salts (such as iron(III) chloride, potassium octoate, aluminum tri(ethylacetoacetate), zinc acetyl acetonate and zinc octoate), tin compounds (such as tin(II) octoate, tin(II) ethylhexanoate, tin(II) laurate, dibutyl tin oxide, dibutyl tin dichloride, dibutyl tin diacetate, dibutyl tin dilaurate, dibutyl tin maleate and dioctyl tin diacetate) and mineral acids (such as sulfuric acid, hydrochloric acid, phosphoric acid and perchloric acid). These catalysts are generally used in quantities of 0 to 5% by weight, based on the reaction mixture.

The reaction according to the invention may also be carried out in two stages by initially reacting components A1) and B) in a preliminary reaction at temperatures of up to 120° C. to form the corresponding products containing urethane groups, followed by allophanatization at elevated temperatures of up to 200° C., preferably up to 160° C.

In the one step process polyisocyanate component A2) corresponds to the excess of unreacted starting polyisocyanate A1), which is still present after urethanization reaction. In accordance with the two step process it is possible, although not necessary, to use a mixture of unreacted excess starting polyisocyanate A1) and an additional starting polyisocyanate added after urethanization as polyisocyanate component A2). An example of this procedure is to carry out the urethanization reaction using IPDI and then to add HDI to the reaction mixture as an additional diisocyanate after urethanization and before allophanatization.

After preparation of the polyisocyanates containing allophanate groups, it is preferred, although not necessary to remove a portion of the excess distillable starting diisocyanate by distillation, preferably by thin-layer distillation. After removal the monomer content should be less than 15% by weight, preferably less than 5% by weight, more preferably less than 2% by weight and most preferably less than 0.5% by weight.

The ethylenically unsaturated polyisocyanates containing allophanate groups have
a) an NCO content of 5 to 25%, preferably 6 to 20% and more preferably 7 to 16% by weight,
b) an allophanate group content (calculated as $N_2C_2HO_3$, MW 101) of 1 to 30%, preferably 5 to 30% by weight and
c) a total content of $\beta,\gamma$-ethylenically unsaturated groups of (calculated as C=C, MW 24) of 0.5 to 15%, preferably 3 to 12% by weight.

Ethylenically unsaturated polyurethanes 1) according to the invention are prepared by reacting the corresponding polyisocyanates with hydroxy-functional, ethylenically unsaturated compounds, preferably with hydroxyalkyl (meth)acrylates and/or $\beta,\gamma$-ethylenically unsaturated ether alcohols B1) and more preferably with hydroxyalkyl (meth) acrylates. The choice of unsaturated alcohol depends in part upon the curing mechanism that will subsequently be used, i.e., curing with ultraviolet light (UV) or an electron beam, curing at elevated temperatures in the presence of peroxides or azo compounds, or curing under ambient conditions with metal siccatives in the presence of oxygen or peroxides.

Hydroxyalkyl (meth)acrylates are preferred when the polyurethanes are cured by ultraviolet light or with an electron beam. It is necessary for allyl ether groups to be present when the coatings are cured under ambient conditions in the presence of metal siccatives because hydroxyalkyl (meth)acrylates can only be cured with UV or an electron beam, or at elevated temperatures. However, since allyl ether groups have previously been incorporated via allophanate groups, it is not necessary to use them to react with the isocyanate groups during this step. This is because once the allyl ether groups have been initiated, they can react with the other types of hydroxy-functional ethylenically unsaturated compounds, such as the hydroxyalkyl (meth) acrylates.

Accordingly, 0 to 100%, preferably 50 to 100%, more preferably 80 to 100% and most preferably 100% of the isocyanate groups present in the ethylenically unsaturated polyisocyanates should be reacted with hydroxyalkyl (meth) acrylates. The remainder of the isocyanate groups are reacted with other hydroxy-functional ethylenically unsaturated compounds, such as $\beta,\gamma$-ethylenically unsaturated ether alcohols B1).

Examples of suitable hydroxy-functional, preferably monohydroxy-functional, ethylenically unsaturated compounds include hydroxyalkyl esters of acrylic or methacrylic acid containing 1 to 8 carbons in the alkyl group, such as the 2-hydroxyethyl, 2-hydroxypropyl, and 2-, 3- or 4-hydroxybutyl esters of the acrylic or methacrylic acid; hydroxyalkyl vinyl ethers such as 2-hydroxyethyl vinyl ether and 4-hydroxybutyl vinyl ether; reaction products of (meth)acrylic acids with monoepoxide compounds; addition products of 1 or more moles of $\epsilon$-caprolactone with 1 mole of the hydroxyalkyl (meth)acrylic esters; and alkoxylation products of these hydroxyalkyl (meth)acrylic esters, preferably with propylene or ethylene oxide, more preferably with propylene oxide.

The properties of the unsaturated polyurethanes can be modified by the choice of the unsaturated alcohol. For example, polyisocyanates reacted with hydroxyalkyl (meth) acrylates will result in harder coatings than polyisocyanates modified with addition products of $\epsilon$-caprolactone and hydroxyalkyl (meth)acrylic esters or with alkoxylation products of these hydroxyalkyl (meth)acrylic esters.

Ethylenically unsaturated polyurethanes I) according to the invention are substantially free from isocyanate groups and have
a) a content of $\beta,\gamma$-ethylenically unsaturated ether groups (calculated as C=C, MW 24) incorporated through allophanate groups of 0.5 to 10%, preferably 2 to 10% and more preferably 2 to 8% by weight,
b) an allophanate group content (calculated as $N_2C_2HO_3$, MW 101) of 1 to 20%, preferably 3 to 15% by weight and
c) a total content of ethylenically unsaturated groups of (calculated as C=C, MW 24) of 1 to 20%, preferably 3 to 15% by weight.

The ethylenically unsaturated polyurethanes generally have a viscosity at 25° C. of less than 200,000 mPa·s, preferably less than 100,000 mPa·s, more preferably less than 50,000 mPa·s and most preferably less than 20,000 mPa·s. Preferably, these viscosities are obtained for the neat resins, i.e., in the absence of solvents or copolymerizable monomers.

Component II) is selected from ethylenically unsaturated polyurethanes which are substantially free from isocyanate groups and are based on the reaction product of
a) cyclic diisocyanates having (cyclo)aliphatically bound isocyanate groups with
b) compounds containing alcoholic hydroxyl groups and prepared at a COOH/OH equivalent ratio of 0.6 to 0.95 from
  i) (meth)acrylic acid (e.g., acrylic acid, methacrylic acid and mixtures thereof),
  ii) tri- or tetrahydric ether alcohols having a molecular weight of 180 to 1000, which contain 2 to 10 ethylene oxide units, —$CH_2$—$CH_2$—O—, as part of one or more ether structures and which may contain up to 20 mole %, based on the total moles of alkylene oxide units, of propylene oxide units, —$CH_2$—$CH(CH_3)$—O—.

Suitable polyisocyanates a) include the cyclic polyisocyanates previously disclosed as being suitable for use as polyisocyanate starting component A1). Preferred examples include 1-isocyanato-3,3,5-trimethyl-5-isocyanatomethyl cyclohexane (IPDI), 4,4'-bis-(isocyanato-cyclohexyl)-methane (HMDI), hexahydro-2,4- and/or -2,6-diisocyanatotoluene and 1-isocyanato-4(3)-isocyanatomethyl-1-methyl cyclohexane. IPDI is especially preferred.

Alcohols b-ii) include the known low molecular weight tri- or tetrahydric alcohols which are free from ether groups, such as glycerine, trimethylolpropane, trimethylolethane, pentaerythritol and mixtures thereof. Also suitable are the ethoxylation products of these alcohols having a degree of ethoxylation of 2 to 10, preferably 2 to 6. The degree of ethoxylation represents the average number of moles of ethylene oxide which have been added onto 1 mole of an alcohol starter molecule. The polyether chains may contain up to 20 mole %, preferably less than 10 mole %, based on the total moles of alkylene oxide units, of propylene oxide units.

The reaction of components b-i) and b-ii) is carried out in known manner, e.g., by the azeotropic esterification of (meth)acrylic acid with alcohols b-ii). The conditions of the esterification reaction are generally maintained until the solvent-free esterification products have an acid number of less than 10 mg KOH/g.

Compounds II) are then prepared by reacting cyclic polyisocyanates a) with hydroxy component b) at an NCO/OH equivalent ratio of approximately 1:1.

In the compositions according to the invention component I) is present in an amount of 5 to 95% by weight, preferably 10 to 90% by weight and more preferably 20 to 80% by weight, and component II) is present in an amount of 5 to 95% by weight, preferably 10 to 90% by weight and more preferably 20 to 80% by weight, wherein the preceding percentages are based on the weight of components I) and II).

In addition, to urethane-containing resins I) and II) the coating compositions according to the invention may also contain copolymerizable monomers, which also serve the function as a reactive diluent. The copolymerizable monomers are selected from organic compounds which contain at least one copolymerizable olefinic double bond, preferably 2 or more double bonds, and preferably have a viscosity of not more than 1000, more preferably not more than 500 mPa.s at 23° C., such as di- and polyacrylates and di- and polymethacrylates of glycols having 2 to 6 carbon atoms and polyols having 3 to 4 hydroxyl groups and 3 to 6 carbon atoms.

Examples include ethylene glycol diacrylate, propane 1,3-diol diacrylate, butane 1,4-diol diacrylate, hexane 1,6-diol diacrylate, trimethylolpropane triacrylate, pentaerythritol tri- and tetraacrylate, and the corresponding methacrylates. Also suitable are di(meth)acrylates of polyether glycols of initiated with ethylene glycol, propane 1,3-diol, butane 1,4-diol; triacrylates of the reaction products of 1 mole of trimethylolpropane with 2.5 to 5 moles of ethylene oxide and/or propylene oxide; and tri- and tetraacrylates of the reaction products of 1 mole of pentaerythritol with 3 to 6 moles of ethylene oxide and/or propylene oxide. Other copolymerizable monomers include aromatic vinyl compounds such as styrene; vinyl alkyl ethers such as vinylbutyl ether or triethylene glycol divinyl ether; and allyl compounds such as triallylisocyanurate. Preferably, the copolymerizable monomers have functionalities of two or more.

The copolymerizable monomers may be present in amounts of up to 200% by weight, preferably up to 100% by weight and more preferably up to 50% by weight, based on the weight of components I) and I).

The low viscosity coating compositions according to the invention may also contain other known additives. Examples of these additives include organic solvents, wetting agents, flow control agents, antiskinning agents, antifoaming agents, matting agents, (such as silica, aluminum silicates and high-boiling waxes), viscosity regulators, pigments, dyes, UV absorbers and stabilizers against thermal and oxidative degradation.

Examples of suitable solvents include those known from polyurethane coating technology such as toluene, xylene, cyclohexane, butyl acetate, ethyl acetate, ethyl glycol acetate, methoxypropyl acetate (MPA), acetone, methyl ethyl ketone and mixtures thereof. The organic solvents may be present in amounts of up to 200% by weight, preferably up to 100% by weight and more preferably up to 20% by weight, based on the weight of components I), II) and III).

The coating compositions may be used to coat substrates of any kind, such as wood, plastics, leather, paper, textiles, glass, ceramics, plaster, masonry, metals and concrete. They may be applied by standard methods, such as spray coating, spread coating, flood coating, casting, dip coating, roll coating. The coating compositions may be clear or pigmented.

After the evaporation of any inert solvents used, the coatings may be crosslinked either by high-energy radiation, such as UV light, electron beams or γ rays, by heating to elevated temperatures in the presence of peroxides or azo compounds, or by curing with metal salts of siccative acids and optionally (hydro)peroxides at either elevated temperatures or at temperatures of room temperature or below.

When the coatings are crosslinked by UV irradiation, photoinitiators are added to the coating composition. Suitable photo-initiators are known and include those described in the book by J. Korsar entitled "Light-Sensitive Systems", J. Wiley & Sons, New York-London-Sydney, 1976, and in Houben-Weyl, Methoden der organischen Chemie, Volume E 20, page 80 et seq, Georg Thieme Verlag, Stuttgart, 1987.

Particularly suitable photoinitiators include benzoin ethers such as benzoin isopropyl ether, benzil ketals such as benzil dimethylketal, and hydroxyalkyl phenones such as 1-phenyl-2-hydroxy-2-methylpropan-1-one. The photoinitiators may be added in amounts, depending upon the application, of 0.1 to 10%, preferably 0.1 to 5% by weight, based on the weight of the ethylenically unsaturated polyurethanes and any other copolymerizable monomers. The photoinitiators may be added individually or may be used as mixtures to obtain advantageous synergistic effects.

To cure the coating compositions at elevated temperatures, curing must be conducted in the presence of 0.1 to 10%, preferably 0.1 to 5% by weight, based on the weight of the ethylenically unsaturated polyurethanes, of initiators such as peroxides or azo compounds. Temperatures of 80 to 240° C., preferably 120 to 160° C., are needed to cure the coating compositions at elevated temperatures. Suitable initiators include the known free-radical initiators, e.g., aliphatic azo compounds such as azodiisobutyronitrile, azo-bis-2-methyl-valeronitrile, 1,1'-azo-bis-1-cyclohexanenitrile and alkyl 2,2'-azo-bis-isobutyrates; symmetrical diacyl peroxides such as acetyl, propionyl or butyryl peroxide, benzoyl peroxides substituted by bromo, nitro, methyl or methoxy groups, and lauryl peroxides; symmetrical peroxydicarbonates such as diethyl, diisopropyl, dicyclohexyl and dibenzoyl peroxydicarbonate; tert-butyl peroxy-2-ethylhexanoate and tert-butyl perbenzoate; hydroperoxides such as tert-butyl hydroperoxide and cumene hydroperoxide; and dialkyl peroxides such as dicumyl peroxide, tert-butyl cumyl peroxide or ditert-butyl peroxide.

The coating compositions according to the invention may also be cured at room temperature in the presence of siccatives and optionally (hydro)peroxides. Suitable siccatives are known and include metal salts, preferably cobalt or vanadium salts, of acids such as linseed oil fatty acids, tall oil fatty acids and soybean oil fatty acids; resinic acids such as abietic acid and naphthenic acid; acetic acid; isooctanoic acid; and inorganic acids such as hydrochloric acid and sulfuric acid. Cobalt and vanadium compounds which are soluble in the coating compositions and act as siccatives are particularly suitable and include salts of the acids mentioned above and also commercial products such as "Vanadiumbeschleuniger VN-2 (Vanadium Accelerator VN-2)" marketed by Akzo. The siccatives are generally used in the form of organic solutions in quantities such that the metal content is 0.0005 to 1.0% by weight, preferably 0.001 to 0.5% by weight, based on the weight of the ethylenically unsaturated polyurethanes.

Examples of (hydro)peroxides include di-tert.-butyl peroxide, benzoyl peroxide, cyclohexanone peroxide, methyl ethyl ketone peroxide, acetyl acetone peroxide, dinonyl peroxide, bis-(4-tert.-butylcyclohexyl)-peroxydicarbonate, tert.-butyl hydroperoxide, cumene hydroperoxide, 2,5-dimethyl-hexane-2,5-hydroperoxide and diisopropyl benzene monohydroperoxide. The (hydro) peroxides are preferably used in quantities of 1 to 10% by weight, based on the weight of the ethylenically unsaturated polyurethanes.

When cured in the presence of cobalt and peroxides, the coating compositions generally cure over a period of 1 to 24 hours at 20° C. to form high-quality coatings. However, curing may also take place at lower temperatures (for example −5° C.) or more quickly at higher temperatures of up to 130° C.

The following examples and comparison examples are intended to illustrate the invention without limiting it in any way. All quantities in "parts" and "%" are by weight unless otherwise indicated.

EXAMPLES

Example 1
Preparation of an ethylenically unsaturated polyisocyanate 100 parts of 1,6-hexamethylene diisocyanate were introduced into a nitrogen-purged stirred reactor, followed by the addition at 25° C. of 31.9 parts of trimethylolpropane diallylether and 0.09%, based on the weight of the reactants, of stannous octoate. The reaction temperature was increased to 100° C. for the allophanitization reaction and maintained at that temperature for about 5 hours until an NCO content of 26.2% was reached. The excess diisocyanate was then removed under vacuum (100 mtorr) in a wiped film evaporator at a temperature of 160° C. The resulting product had the following properties:

| | |
|---|---|
| NCO content: | 13.06% |
| Viscosity (25° C.): | 1610 mPa · s |
| free HDI content: | 0.25% |
| Allophanate group content: | ~18% (calculated) |
| β,γ-ethylenically unsaturated group content (C=C, MW 24): | ~8.7% (calculated) |

Example 2
Preparation of an ethylenically unsaturated polyurethane (Component I according to the invention)

A round bottomed flask was charged with one equivalent of the ethylenically unsaturated polyisocyanate from Example 1 and 0.01%, based on the weight of the final product, of dibutyltin dilaurate. The flask was equipped with an overhead stirrer, nitrogen inlet, thermocouple, temperature controller, heating mantle and condenser. One equivalent of hydroxyethyl acrylate was then incrementally added to the stirred flask under a nitrogen blanket such that the temperature did not exceed 60° C. After the addition was complete the temperature was maintained at 60° C. for two hours until the isocyanate content was less than 0.5% by weight as determined by titration. A urethane acrylate was obtained having the following properties:

| | |
|---|---|
| Viscosity (25° C.): | 12,700 mPa · s |
| Allophanate group content: | 13.2% (calculated) |
| β,γ-ethylenically unsaturated group content (C=C, MW 24): | 6.4% (calculated) |
| Total ethylenically unsaturated group content (C=C, MW 24): | 11.9% (calculated) |

Example 3
Preparation of an ethylenically unsaturated polyurethane (Component II according to the invention)

The reaction product of 1 mole of trimethylol propane and 3 moles of ethylene oxide was reacted with 2.6 moles of acrylic acid to form a hydroxy group-containing product. This product was then reacted with isophorone diisocyanate at an NCO/OH equivalent ratio of ~1:1 to form an ethylenically unsaturated polyurethane.

Application Examples
Coatings prepared from the unsaturated polyurethanes

Coatings were prepared from the unsaturated polyurethanes of Examples 2 and 3 using the following formulation:

Formulation: 62.5 parts of the unsaturated polyurethanes from Examples 2 and 3 (specific amounts set forth in the Table)

33.65 parts of tripropylene glycol diacrylate 1.93 parts of 2-hydroxy-2-methyl-1-phenylpropan-1-one (Darocur 1173, available from Ciba-Geigy)

1.93 parts of a mixture of 1-hydroxyl cyclohexyl phenyl ketone and benzophone (Irgacure 500, available from Ciba-Geigy).

The formulations were prepared by hand mixing the above ingredients in order. Films were drawn down onto glass panels in amounts sufficient to obtain a dry film thickness of about 2 mils. The films were cured by passing the coated panels under 300 watt bulbs at a height of 15 cm for 3 passes through the UV oven. At a speed of 3.7 m/min through the UV oven, 3 passes corresponded to ~3300 mJ/cm$^2$ (approximately ~1100 mJ/cm$^2$ per pass).

The pendulum hardness (ASTM D4366) and abrasion resistance (ASTM D4060), of the coated substrates, which were measured after 14 days, are set forth in the following table. The drag rating and load, which are discussed below and which were measured after 28 days, are also set forth in the following table.

| Weight Ratio of Unsaturated Polyurethanes | Pendulum Hardness (sec) | Abrasion Resistance 250/500 Cycles (mg loss) | Drag Rating | Load |
|---|---|---|---|---|
| 100% unsaturated PUR from Ex. 2 | 119 | 2.8/7.1 | 5 | 10% |
| 90%/10% blend | — | 24.0/42.2 | — | |
| 85%/15% blend | 117 | | 4 | 10% |
| 70%/30% blend | 120 | | 3 | 5% |
| 50%/50% blend | 117 | 27.3/34.4 | 1 | 5% |
| 30%/70% blend | 112 | | 2 | 5% |
| 15%/85% blend | 115 | | 2 | 10% |
| 100% unsaturated PUR from Ex. 3 | 113 | 2.5/7.6 | 4 | 30% |

Even though the pendulum hardness for the various coatings was approximately the same, there is a substantial difference in the overall sandability between substrates coated with the blends according to the invention and substrates coated with the individual unsaturated polyurethanes. Sandability was determined by three different factors, i.e., abrasion resistance, the drag of sandpaper across the coated substrate and the amount of material that adheres to the sandpaper (load).

The higher the amount of material removed in the abrasion test, the easier the coated substrate was to sand. Drag was measured by determining the resistance of the coated substrate to the movement of 320 grit sandpaper (1=least resistance; 5=most resistance). Load was determined by sanding the coated substrate and then determining the percentage of the coating that adhered to the sandpaper, based on the amount of coating that was easily released from the sandpaper by "flicking" it.

Based on the results from these three sandability tests, it is apparent that substrates coated with the blends according to the invention possessed better overall sandability than substrates coated with either individual resin.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mixture of ethylenically unsaturated polyurethanes comprising
   I) 5 to 95% by weight, based on the weight of components I) and II), of an ethylenically unsaturated polyurethane which is substantially free from isocyanate groups and has
      a) a content of $\beta,\gamma$-ethylenically unsaturated ether groups (calculated as C=C, MW 24) incorporated through allophanate groups of 0.5 to 10% by weight,
      b) an allophanate group content (calculated as $N_2C_2HO_3$, MW 101) of 1 to 20% by weight and
      c) a total content of ethylenically unsaturated groups (calculated as C=C, MW 24) of 1 to 20% by weight,
   II) 5 to 95% by weight, based on the weight of components I) and II), of an ethylenically unsaturated polyurethane which is substantially free from isocyanate groups and is based on the reaction product of
      a) a cyclic diisocyanate having (cyclo)aliphatically bound isocyanate groups with
      b) a compound containing alcoholic hydroxyl groups and prepared at a COOH/OH equivalent ratio of 0.6 to 0.95 from
         i) (meth)acrylic acid and
         ii) a tri- or tetrahydric ether alcohol having a molecular weight of 180 to 1000, which contains 2 to 10 ethylene oxide units, —$CH_2$—$CH_2$—O—, as part of one or more ether structures and which contains up to 20 mole %, based on the total moles of alkylene oxide units, of propylene oxide units, —$CH_2$—$CH(CH_3)$—O—, and
   III) up to 200%, based on the total weight of the coating composition, of a copolymerizable monomer that does not contain urethane groups.

2. The mixture of claim 1 wherein ethylenically unsaturated polyurethane component I) has
   a) a content of $\beta,\gamma$-ethylenically unsaturated ether groups (calculated as C=C, MW 24) incorporated through allophanate groups of 2 to 10% by weight,
   b) an allophanate group content (calculated as $N_2C_2HO_3$, MW 101) of 3 to 15% by weight and
   c) a total content of ethylenically unsaturated groups of (calculated as C=C, MW 24) of 3 to 15% by weight.

3. The mixture of claim 1 wherein component I) is present in an amount of 10 to 90% by weight and component II) is present in an amount of 10 to 90% by weight, wherein these percentages are based on the total weight of components I) and II).

4. The mixture of claim 2 wherein component I) is present in an amount of 10 to 90% by weight and component II) is present in an amount of 10 to 90% by weight, wherein these percentages are based on the total weight of components I) and II).

5. The mixture of claim 1 wherein said $\beta,\gamma$-ethylenically unsaturated ether groups are incorporated as the reaction product of isocyanate groups with a $\beta,\gamma$-ethylenically unsaturated ether alcohol comprising a member selected from the group consisting of allyl alcohol, glycerol diallyl ether, trimethylol propane diallyl ether and pentaerythritol triallyl ether.

6. The mixture of claim 2 wherein said $\beta,\gamma$-ethylenically unsaturated ether groups are incorporated as the reaction product of isocyanate groups with a $\beta,\gamma$-ethylenically unsaturated ether alcohol comprising a member selected from the group consisting of allyl alcohol, glycerol diallyl ether, trimethylol propane diallyl ether and pentaerythritol triallyl ether.

7. The mixture of claim 3 wherein said $\beta,\gamma$-ethylenically unsaturated ether groups are incorporated as the reaction product of isocyanate groups with a $\beta,\gamma$-ethylenically unsaturated ether alcohol comprising a member selected from the group consisting of allyl alcohol, glycerol diallyl ether, trimethylol propane diallyl ether and pentaerythritol triallyl ether.

8. The mixture of claim 4 wherein said $\beta,\gamma$-ethylenically unsaturated ether groups are incorporated as the reaction product of isocyanate groups with a $\beta,\gamma$-ethylenically unsaturated ether alcohol comprising a member selected from the group consisting of allyl alcohol, glycerol diallyl ether, trimethylol propane diallyl ether and pentaerythritol triallyl ether.

9. The mixture of claim 1 wherein a portion of ethylenically unsaturated groups c) are incorporated as the reaction product of isocyanate groups with a hydroxyalkyl ester of acrylic or methacrylic acid containing 1 to 8 carbons in the alkyl group.

10. The mixture of claim 2 wherein a portion of ethylenically unsaturated groups c) are incorporated as the reaction product of an isocyanate group with a hydroxyalkyl ester of acrylic or methacrylic acid containing 1 to 8 carbons in the alkyl group.

11. The mixture of claim 3 wherein a portion of ethylenically unsaturated groups c) are incorporated as the reaction product of an isocyanate group with a hydroxyalkyl ester of acrylic or methacrylic acid containing 1 to 8 carbons in the alkyl group.

12. The mixture of claim 4 wherein a portion of ethylenically unsaturated groups c) are incorporated as the reaction product of an isocyanate group with a hydroxyalkyl ester of acrylic or methacrylic acid containing 1 to 8 carbons in the alkyl group.

13. The mixture of claim 5 wherein a portion of ethylenically unsaturated groups c) are incorporated as the reaction product of an isocyanate group with a hydroxyalkyl ester of acrylic or methacrylic acid containing 1 to 8 carbons in the alkyl group.

14. The mixture of claim 6 wherein a portion of ethylenically unsaturated groups c) are incorporated as the reaction product of an isocyanate group with a hydroxyalkyl ester of acrylic or methacrylic acid containing 1 to 8 carbons in the alkyl group.

15. The mixture of claim 7 wherein a portion of ethylenically unsaturated groups c) are incorporated as the reaction product of an isocyanate group with a hydroxyalkyl ester of acrylic or methacrylic acid containing 1 to 8 carbons in the alkyl group.

16. The mixture of claim 8 wherein a portion of ethylenically unsaturated groups c) are incorporated as the reaction product of an isocyanate group with a hydroxyalkyl ester of acrylic or methacrylic acid containing 1 to 8 carbons in the alkyl group.

17. A one-component coating composition which contains as binder the mixture of claim 1.

* * * * *